(12) United States Patent
Ye

(10) Patent No.: US 7,230,777 B2
(45) Date of Patent: Jun. 12, 2007

(54) LENS UNIT AND COMPACT IMAGE PICKUP MODULE

(75) Inventor: Zhijin Ye, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/393,709

(22) Filed: Mar. 31, 2006

(65) Prior Publication Data

US 2006/0221469 A1  Oct. 5, 2006

(30) Foreign Application Priority Data

Mar. 31, 2005  (JP) ............................. 2005-103042

(51) Int. Cl.
*G02B 7/02* (2006.01)
*G02B 15/14* (2006.01)
*G03B 17/00* (2006.01)

(52) U.S. Cl. ...................... 359/811; 359/819; 359/826; 359/823; 359/701; 396/72; 396/75

(58) Field of Classification Search ................ 359/811, 359/819, 820, 822, 823, 825–827, 830, 696, 359/700, 701, 704, 719, 641, 478; 396/72, 396/73, 75, 85, 348, 349; 372/101, 107, 372/108

See application file for complete search history.

(56) References Cited

U.S. PATENT DOCUMENTS 2,240,827 A * 5/1941 Bangert et al. ............. 359/830
2,918,842 A * 12/1959 Smith ......................... 359/478
4,525,050 A * 6/1985 Ohashi ......................... 396/75
4,791,441 A * 12/1988 Nishi et al. .................... 396/75
5,177,641 A * 1/1993 Kobayashi et al. .......... 359/820
5,712,734 A * 1/1998 Kanno ......................... 359/701
5,900,992 A * 5/1999 Kodaka et al. .............. 359/702
7,129,474 B2 * 10/2006 Kobayashi ................... 250/234
2005/0168846 A1 * 8/2005 Ye et al. ...................... 359/819

FOREIGN PATENT DOCUMENTS

JP      2002-82272 A      3/2002

* cited by examiner

*Primary Examiner*—Loha Ben
(74) *Attorney, Agent, or Firm*—Sughrue Mion, PLLC

(57) ABSTRACT

The lens unit includes an imaging lens including lenses, each of which includes a lens portion having an optical function and a flange portion on a periphery of the lens portion, and a ring-shaped lens holding member provided between the lenses and holds at least one of the lenses and a cylindrical-shaped lens-barrel including a lens holding portion that holds the imaging lens. The flange portion of each of the lenses is fittable to the flange portion of the other lens of the lenses, or the lens holding portion or an inner surface of the lens-barrel, and the lenses combined with each other through fitting to the flange portion of the other lens, the lens holding portion or the inner surface of the lens-barrel have respective shapes in which optical axes of the lenses coincide each other under a fitting state. The compact image pickup module includes the lens unit.

16 Claims, 5 Drawing Sheets

LENS UNIT AND COMPACT IMAGE PICKUP MODULE

BACKGROUND OF THE INVENTION

The present invention relates to a lens unit and a compact image pickup module that are attached to a mobile telephone or a personal digital assistant (PDA) with a photographing function, an inexpensive, compact, and fixed-focus digital camera, or the like and include an imaging lens including multiple lenses and a lens holding member. In particular, the present invention relates to a lens unit and a compact image pickup module that use lenses in easy-to-manufacture shapes, is high in alignment accuracy or registration accuracy of the optical axis of each lens, and is easy to assemble.

A compact image pickup module installed in a mobile telephone or a PDA with a photographing function, a compact digital camera, or the like is ordinarily constructed by combining an imaging element holding member (hereinafter referred to as "CCD holder") that holds an image pickup element (generally a CCD sensor), and a cylindrical lens-barrel that holds an imaging lens.

Such a compact image pickup module generally uses a CCD holder having a through hole and is assembled by fixing a CCD sensor to one end of the through hole, accommodating a lens-barrel holding the imaging lens from the other end of the through hole, and fixing the lens-barrel.

More specifically, as is well known, screw threads are cut into the inner wall surface of the CCD holder and the outer wall surface of the lens-barrel and are caused to mesh with each other. Then, focusing (focus adjustment) is performed by adjusting a distance between the light receiving surface of the CCD sensor and the imaging lens through adjustment of the screwing amount into the lens-barrel. After the focus adjustment is performed, the CCD holder and the lens-barrel are fixed to each other using an adhesive or the like when the compact image pickup module is a fixed focus module.

Also, as a result of technological advancement in recent years, the image pickup element, such as the CCD sensor, has a highly reduced size and increased resolution. Therefore, the imaging lens (lens unit) applied to the compact image pickup module is also required to have resolving power with which it is possible to separate thin lines at a level of 150 to 200 [1 p/mm] from each other. That is, an imaging lens having such high resolving power needs to be used as the imaging lens.

It is difficult to realize an imaging lens (lens unit) having such resolving power using a single lens. Therefore, an imaging lens (lens unit) having intended resolving power or precision is ordinarily realized using a combination lens obtained by combining multiple lenses with each other.

As schematically shown in FIG. 6, such an imaging lens (lens unit) produced by combining multiple lenses with each other ordinarily uses lenses 100 (100a, 100b, and 100c) having mutually different outer diameters and a lens-barrel 102 obtained by forming a lens holding portion whose size is changed stepwise so as to correspond to the respective lens diameters, and is constructed by incorporating the lenses into the lens-barrel 102 in the order of the lens 10c, the lens 10b, and the lens 100a in accordance with the lens diameters and fixing the lenses 100 to the lens-barrel 102 (see, for example, JP 2002-82272 A).

As a matter of course, in order to obtain a high-quality photography image, it is required that the imaging lens is fixed so that the optical axis of the imaging lens, that is, the lens-barrel is not inclined with respect to the light receiving surface of the CCD sensor.

When the optical axis is inclined, an imaging surface is also of course inclined, so a photographed image is not appropriately formed on the light receiving surface of the CCD sensor and image quality is degraded.

As described above, however, in the conventional compact image pickup module, the screw threads of the lens-barrel and the CCD holder are caused to mesh with each other, focus adjustment is performed by adjusting the screwing amount, and then the lens-barrel and the CCD holder are fixed to each other. With this construction, gaps inevitably exist between the screw threads, so the lens-barrel is inclined and the optical axis of the imaging lens is inclined.

As described above, the CCD sensor has a highly reduced size and increased resolution due to the recent technological advancement and therefore an imaging lens having high resolving power, with which it is possible to separate thin lines at a level of 150 to 200 [1 p/mm] from each other, is used as the imaging lens applied to the compact image pickup module. Therefore, even when the optical axis is slightly inclined, there occurs extremely significant image quality degradation.

Further, in an imaging lens provided with a plurality of lenses as described in JP 2002-82272 A, as a matter of course, in order to obtain a high-quality photography image, it is required that the optical axes of the lenses 100 incorporated into the lens-barrel 102 appropriately coincide with each other. In particular, in the compact image pickup unit, the imaging lens is required to have high resolving power as described above. Therefore, even when slight displacements (hereinafter referred to as "inter-lens eccentricity") among the optical axes of the lenses 100 occur, there occurs extremely significant image quality degradation.

Between the lens-barrel 102 and the lenses 100, however, gaps (clearances) for incorporating the lenses 100 into the lens-barrel 102 exist, so the incorporated lenses 100 move in the lens-barrel 102 and the inter-lens eccentricity occurs.

SUMMARY OF THE INVENTION

The present invention has been made in order to solve the problems of the conventional techniques described above.

Therefore, an object of the present invention is to provide a lens unit that uses lenses in easy-to-manufacture shapes, is high in dimensional holding accuracy of the optical axis of each lens, and is easy to assemble.

Another object of the present invention is to provide a compact image pickup module using the lens unit.

In order to attain the above object, a first aspect of the present invention provides a lens unit, including:

an imaging lens including plural lenses and a ring-shaped lens holding member that is provided at at least one place between the plural lenses and holds at least one of the plural lenses; and a cylindrical-shaped lens-barrel including a lens holding portion that holds the imaging lens, wherein each of the plural lenses includes a lens portion having an optical function and a flange portion on a periphery of the lens portion, the flange portion of each of the plural lenses being fittable to the flange portion of at least one of the other lenses of the plural lenses, or the lens holding portion or an inner surface of the lens-barrel, and lenses which are combined with each other through fitting of the flange portions of the lenses have respective shapes in which optical axes of the lenses coincide each other under a fitting state of the flange portions of the lenses, and wherein the flange portion of one lens of the plural lenses is fitted to the lens holding portion of the lens-barrel and held by the lens holding member in the lens-barrel, and at least two lenses of the plural lenses are positioned by abutting the flange portion of one of the at least two lenses against the lens holding member and an inner surface of the lens-barrel and by fitting the flange portion of another one of the at least two lenses to the flange portion of the one of the at least two lenses, and are arranged in the lens-barrel so that the optical axes of the at least two lenses coincide with the optical axis of the one lens held by the lens holding portion of the lens-barrel.

In the first aspect of the present invention, preferably, each of the plural lenses has a shape in which a position of each lens in an optical axis direction becomes appropriate under at least one of a state in which the flange portion of a lens is fitted to the lens holding portion, a state in which a lens is combined with the at least one of the other lenses through fitting of the flange portion of the lens to the flange portion of the at least one of the other lenses, and a state in which the flange portion of a lens is abutted against the lens holding member.

Further, in the first aspect of the present invention, preferably, a notched portion, whose diameter is smaller than an inner diameter of the inner surface of the lens-barrel, is formed on a lens holding member side of the flange portion of the one of the at least two lenses that is abutted against the inner surface of the lens-barrel.

Further, in the first aspect of the present invention, preferably, one end portion of the lens-barrel is closed, a through hole is formed in the closed one end portion of the lens-barrel, and the lens holding portion is formed to communicate with the through hole, wherein the imaging lens includes three lenses and one lens holding member, and wherein a first lens is fitted to the holding portion of the lens-barrel and is held and positioned by the lens holding member, and a second lens and a third lens combined with each other are positioned through abutting the flange portion of the second lens, to which the flange portion of the third lens is fitted, against the lens holding member and the inner surface of the lens-barrel.

Further, in the first aspect of the present invention, preferably, the plural lenses includes a first lens and at least two lenses having a second lens and a third lens, the flange portion of the first lens is fitted to the lens holding portion of the lens-barrel and the first lens is held by the lens holding member in the lens-barrel, and the at least two lenses including the second lens and third lens are positioned by abutting the flange portion of the second lens against the lens holding member and an inner surface of the lens-barrel and by fitting the flange portion of the third lens to the flange portion of the second lens, and are arranged in the lens-barrel so that the optical axes of the at least two lenses coincide with the optical axis of the first lens held by the lens holding portion of the lens-barrel.

A second aspect of the present invention provides a compact image pickup module, including:

an imaging lens including plural lenses and a ring-shaped lens holding member that is provided at at least one place between the plural lenses and holds at least one of the plural lenses;

a cylindrical-shaped lens-barrel having a lens holding portion that holds the imaging lens;

an image pickup element;

an image pickup element holder which holds the image pickup element and into which the lens-barrel is fitted so as to be rotatable about an optical axis of the imaging lens and movable in a direction of the optical axis of the imaging lens;

a cylindrical cam which has as an upper surface or a lower surface thereof, an annular cam surface whose center is set at the optical axis of the imaging lens and which is formed in one of the lens-barrel and the image pickup element holder; and an abutting member that is abutted against the annular cam surface of the cylindrical cam under a state where the lens-barrel is fitted into the image pickup element holder and which is formed in the other of the lens-barrel and the image pickup element holder, wherein each of the plural lenses includes a lens portion having an optical function and a flange portion on a periphery of the lens portion, the flange portion of each of the plural lenses being fittable to the flange portion of at least one of the other lenses of the plural lenses, or the lens holding portion or an inner surface of the lens-barrel, and lenses which are combined with each other through fitting of the flange portions of the lenses have respective shapes in which optical axes of the lenses coincide with each other under a fitting state of the flange portions of the lenses, and wherein the flange portion of one lens of the plural lenses is fitted to the lens holding portion of the lens-barrel and held by the lens holding member in the lens-barrel, at least two lenses of the plural lenses are positioned by abutting the flange portion of one of the at least two lenses against the lens holding member and an inner surface of the lens-barrel and by fitting the flange portion of another one of the at least two lenses to the flange portion of the one of the at least two lenses, and are arranged in the lens-barrel so that the optical axes of the at least two lenses coincide with the optical axis of the one lens held by the lens holding portion of the lens-barrel, and wherein, after focusing is performed through relative rotation of the lens-barrel and the image pickup element holder, the lens-barrel and the image pickup element holder are fixed to each other.

In the second aspect of the present invention, preferably, each of the plural lenses has a shape in which a position of each lens in an optical axis direction becomes appropriate under at least one of a state in which the flange portion of a lens is fitted to the lens holding portion, a state in which a lens is combined with the at least one of the other lenses through fitting of the flange portion of the lens to the flange portion of the at least one of the other lenses, and a state in which the flange portion of a lens is abutted against the lens holding member.

Further, in the second aspect of the present invention, preferably, a notched portion, whose diameter is smaller than an inner diameter of the inner-surface of the lens-barrel, is formed on a lens holding member side of the flange portion of the one of the at least two lenses that is abutted against the inner surface of the lens-barrel.

Further, in the second aspect of the present invention, preferably, one end portion of the lens-barrel is closed, a through hole is formed in the closed one end portion of the lens-barrel, and the lens holding portion is formed to communicate with the through hole, wherein the imaging lens includes three lenses and one lens holding member, and wherein a first lens is fitted to the holding portion of the lens-barrel and is held and positioned by the lens holding member, and a second lens and a third lens combined with each other are positioned through abutting the flange portion of the second lens, to which the flange portion of the third lens is fitted, against the lens holding member and the inner surface of the lens-barrel.

Further, in the second aspect of the present invention, preferably, the plural lenses includes a first lens and at least two lenses having a second lens and a third lens, the flange portion of the first lens is fitted to the lens holding portion of the lens-barrel and the first lens is held by the lens holding member in the lens-barrel, and the at least two lenses including the second lens and third lens are positioned by abutting the flange portion of the second lens against the lens holding member and an inner surface of the lens-barrel and by fitting the flange portion of the third lens to the flange portion of the second lens, and are arranged in the lens-barrel so that the optical axes of the at least two lenses coincide with the optical axis of the first lens held by the lens holding portion of the lens-barrel.

A third aspect of the present invention provides a compact image pickup module, including:

an imaging lens including plural lenses and a ring-shaped lens holding member that is, provided at at least one place between the plural lenses and holds at least one of the plural lenses;

a cylindrical lens holder whose outer wall surface has a first convex portion formed thereon and which includes a cylindrical-shaped lens-barrel having a lens holding portion that holds the imaging lens;

an image pickup element;

an image pickup element holder which holds the image pickup element, into which the lens holder is inserted so as to be rotatable about an optical axis of the imaging lens and movable in an optical axis direction of the imaging lens, and whose inner wall surface has a second convex portion formed thereon;

a coil spring that engages with the first convex portion of the lens holder and the second convex portion of the image pickup element holder and urges the lens holder and the image pickup element holder in a direction in which a distance therebetween is increased;

a first cylindrical cam that has as an upper surface or a lower surface thereof, an annular cam surface whose center is set at the optical axis of the imaging lens and which gradually increases in height in a circumferential direction, and that is formed in one of the lens holder and the image pickup element holder; and an abutting member that is abutted against the annular cam surface of the first cylindrical cam under a state where the lens holder is inserted into the image pickup element holder and that is formed in the other of the lens holder and the image pickup element holder, wherein each of the plural lenses includes a lens portion having an optical function and a flange portion on a periphery of the lens portion, the flange portion of each of the plural lenses being fittable to the flange portion of at least one of the other lenses of the plural lenses, or the lens holding portion or an inner surface of the lens-barrel, and lenses which are combined with each other through fitting of the flange portions of the lenses have respective shapes in which optical axes of the lenses coincide each other under a fitting state of the flange portions of the lenses, and wherein the flange portion of one lens of the plural lenses is fitted to the lens holding portion of the lens-barrel and held by the lens holding member in the lens-barrel, and at least two lenses of the plural lenses are positioned by abutting the flange portion of one of the at least two lenses against the lens holding member and an inner surface of the lens-barrel and by fitting the flange portion of another one of the at least two lenses to the flange portion of the one of the at least two lenses, and are arranged in the lens-barrel so that the optical axes of the at least two lenses coincide with the optical axis of the one lens held by the lens holding portion of the lens-barrel.

In the third aspect of the present invention, preferably, the lens holder includes:

the lens-barrel that holds the imaging lens in a fixed manner; and a photographing distance switching member into which the lens-barrel is fitted so as to be rotatable about the optical axis of the imaging lens and movable in the optical axis direction of the imaging lens, the compact image pickup module further comprising:

a second cylindrical cam that has as an upper surface or a lower surface thereof, an annular cam surface whose center is set at the optical axis of the imaging lens and that is formed in one of the lens-barrel and the photographing distance switching member; and an abutting member that is abutted against the annular cam surface of the second cylindrical cam under a state where the lens-barrel is fitted into the image pickup element holder and that is formed for the other of the lens-barrel and the photographing distance switching member, wherein, after focusing is performed by adjusting a distance between the imaging lens and the image pickup element in the optical axis direction through relative rotation of the lens-barrel and the photographing distance switching member, the lens-barrel and the photographing distance switching member are fixed to each other.

Further, in the third aspect of the present invention, preferably, each of the plural lenses has a shape in which a position of each lens in an optical axis direction becomes appropriate under at least one of a state in which the flange portion of a lens is fitted to the lens holding portion, a state in which a lens is combined with the at least one of the other lenses through fitting of the flange portion of the lens to the flange portion of the at least one of the other lenses, and a state in which the flange portion of a lens is abutted against the lens holding member.

Further, in the third aspect of the present invention, preferably, a notched portion, whose diameter is smaller than an inner diameter of the inner surface of the lens-barrel, is formed on a lens holding member side of the flange portion of the one of the at least two lenses that is abutted against the inner surface of the lens-barrel.

Further, in the third aspect of the present invention, preferably, one end portion of the lens-barrel is closed, a through hole is formed in the closed one end portion of the lens-barrel, and the lens holding portion is formed to communicate with the through hole, wherein the imaging lens includes three lenses and one lens holding member, and wherein a first lens is fitted to the holding portion of the lens-barrel and is held and positioned by the lens holding member, and a second lens and a third lens combined with each other are positioned through abutting the flange portion of the second lens, to which the flange portion of the third lens is fitted, against the lens holding member and the inner surface of the lens-barrel.

Further, in the third aspect of the present invention, preferably, the plural lenses includes a first lens and at least two lenses having a second lens and a third lens, the flange portion of the first lens is fitted to the lens holding portion of the lens-barrel and the first lens is held by the lens holding member in the lens-barrel, and the at least two lenses including the second lens and third lens are positioned by abutting the flange portion of the second lens against the lens holding member and an inner surface of the lens-barrel and by fitting the flange portion of the third lens to the flange portion of the second lens, and are arranged in the lens-barrel so that the optical axes of the at least two lenses coincide with the optical axis of the first lens held by the lens holding portion of the lens-barrel.

The lens unit according to the present invention includes: an imaging lens including plural lenses and a ring-shaped lens holding member that is provided at at least one place between the plural lenses and holds at least one of the plural lenses; and a cylindrical-shaped lens-barrel including a lens holding portion that holds the imaging lens, wherein each of the plural lenses includes a lens portion having an optical function and a flange portion on a periphery of the lens portion, the flange portion of each of the plural lenses being fittable to the flange portion of at least one of the other lenses of the plural lenses, or the lens holding portion or an inner surface of the lens-barrel, and lenses which are combined with each other through fitting of the flange portions of the lenses have respective shapes in which optical axes of the lenses coincide each other under a fitting state of the flange portions of the lenses, and wherein the flange portion of one lens of the plural lenses is fitted to the lens holding portion of the lens-barrel and held by the lens holding member in the lens-barrel, and at least two lenses of the plural lenses are positioned by abutting the flange portion of one of the at least two lenses against the lens holding member and an inner surface of the lens-barrel and by fitting the flange portion of another one of the at least two lenses to the flange portion of the one of the at least two lenses, and are arranged in the lens-barrel so that the optical axes of the at least two lenses coincide with the optical axis of the one lens held by the lens holding portion of the lens-barrel.

With the lens unit according to the present invention having the construction described above, it becomes possible to bring the optical axes of the lenses in the imaging lens into coincidence with each other and hold the lenses of the imaging lens in the lens-barrel with high dimensional holding accuracy. Also, provision of the lens holding member eliminates the need to fit all lenses to each other and simplifies the constructions of the flange portions. As a result, it becomes possible to simplify the shapes of the lenses and set the lenses in easy-to-manufacture shapes.

Also, with the lens unit according to the present invention, the notched portion, whose diameter is smaller than the inner diameter of the inner surface of the lens-barrel, is formed on the lens holding member side of the flange portion of the lens that is abutted against the inner surface of the lens-barrel, so it becomes easy to insert the lenses fitted to each other into the lens-barrel and it becomes possible to improve assembling ease.

Further, the compact image pickup module according to the present invention includes the lens unit according to the present invention and with the lens unit according to the present invention, it becomes possible to bring the optical axes of the lenses in the imaging lens into coincidence with each other and hold the lenses of the imaging lens in the lens-barrel with high dimensional holding accuracy. Also, the provision of the lens holding member eliminates the need to fit all lenses to each other and simplifies the constructions of the flange portions. Therefore, it becomes possible to simplify the shapes of the lenses and set the lenses in easy-to-manufacture shapes. As a result, it becomes possible to simplify the construction of the compact image pickup module according to the present invention and it also becomes possible to enhance assembling ease.

DETAILED DESCRIPTION OF THE PREFERRED EMBODIMENTS

Hereinafter, a lens unit and a compact image pickup module according to the present invention will be described in detail based on preferred embodiments illustrated in the accompanying drawings.

Hereinafter, the present invention will be described by taking, as an example, a compact image pickup module including the lens unit according to the present invention.

Figure 1:
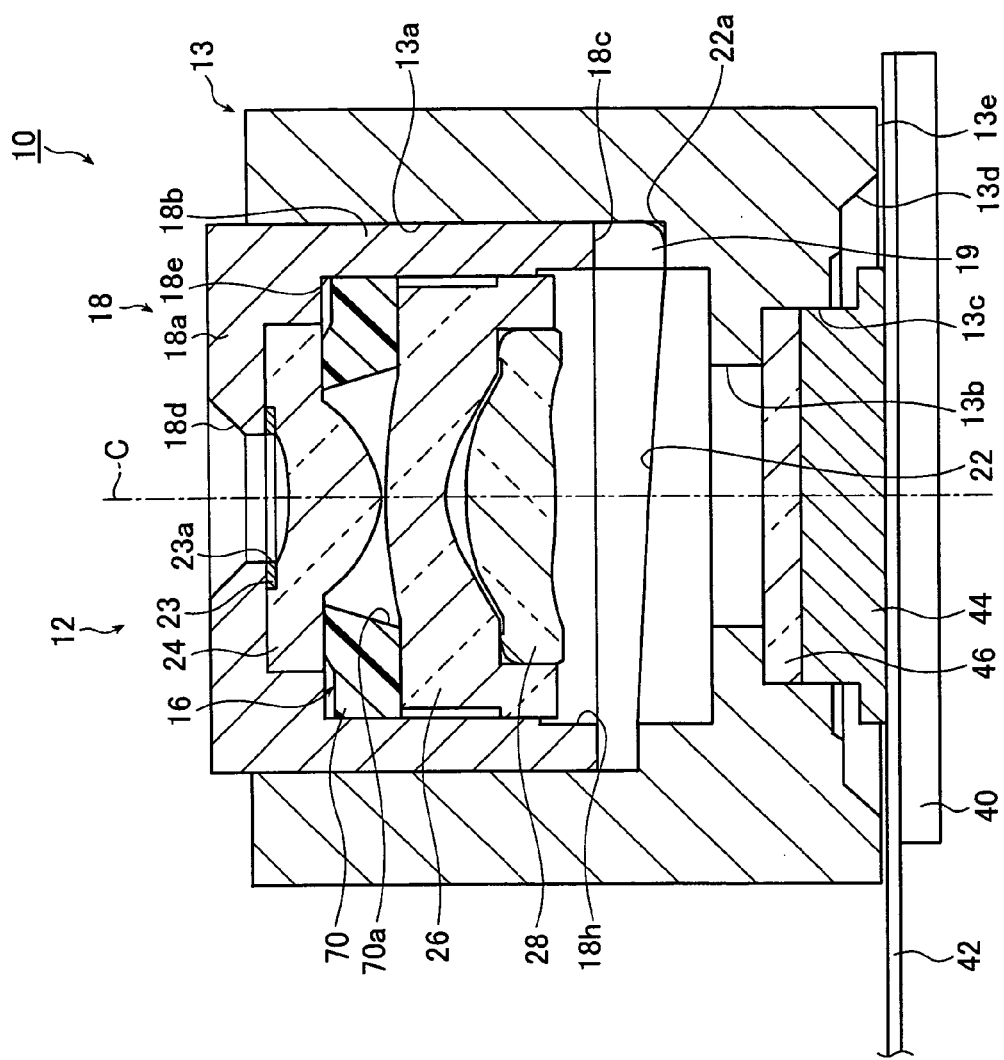
FIG. 1 is a schematic cross-sectional view showing a compact image pickup module according to a first-embodiment of the present invention.

FIG. 1 is a schematic cross-sectional view showing a compact image pickup module according to a first embodiment of the present invention. Note that the cross-sectional view shown in FIG. 1 is taken by cutting a compact image pickup module 10 along a plane containing the optical axis C of an imaging lens 16 (hereinafter simply referred to as "optical axis C").

The compact image pickup module 10 (hereinafter referred to as "image pickup module 10") shown in FIG. 1 is applied to a mobile telephone or a FDA each having a photographing function, an inexpensive, compact, and fixed focus digital camera, or the like, and basically includes a lens unit 12 and a CCD holder (imaging element holder) 13.

The lens unit 12 includes the imaging lens 16 and a lens-barrel 18 that holds the imaging lens 16.

The imaging lens 16 includes three lenses that are a lens 24 (first lens), a lens 26 (second lens) and a lens 28 (third lens), and a lens holding member 70 that is provided between the lens 24 and the lens 26.

Figure 2:
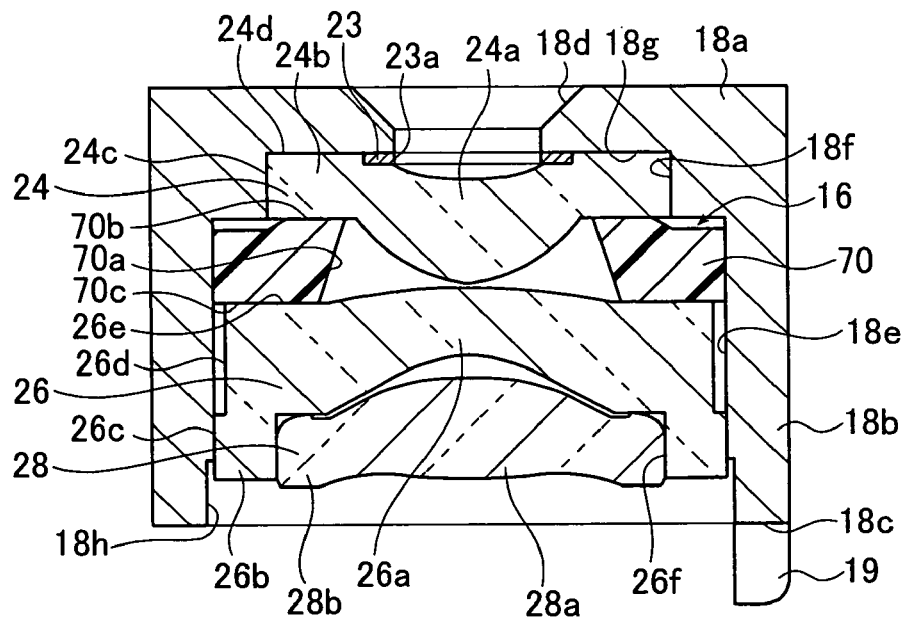
FIG. 2 is a schematic cross-sectional view showing a lens unit of the compact image pickup module in the first embodiment.
Figure 6:
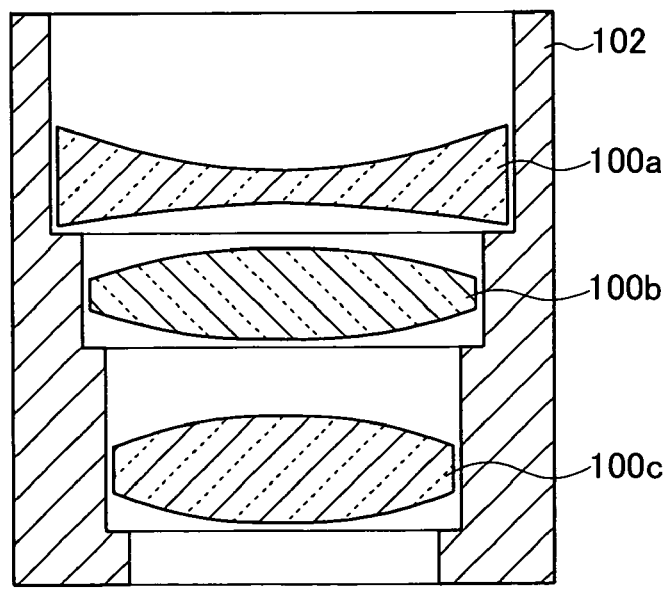
FIG. 6 is a schematic cross-sectional view of a conventional lens unit.

As shown in FIG. 2, the lens 24 includes a lens portion 24a and a flange portion 24b, the lens 26 includes a lens portion 26a and a flange portion 26b, and the lens 28 includes a lens portion 28a and a flange portion 28b, with each lens having a circular shape (when viewed in an optical axis C direction). The lens portions 24a, 26a, and 28a each have a lens action.

Also, the lens holding member 70 is a member for holding the lens 24 and has a construction in which an opening portion 70a is formed in a center portion of a disk-shaped plate material. The lens holding member 70 holds the lens 24 under a state in which the lens portion 24a of the lens 24 enters into the opening portion 70a. In addition, the diameter of a peripheral surface 26c of the flange portion 26b of the lens 26 is approximately the same as the inner diameter of an inner surface 18e of the lens-barrel 18, and a notched portion 26d, whose diameter is smaller than that of the peripheral surface 26c, is formed in the flange portion 26b. The notched portion 26d is formed on a lens holding member 70 side of the flange portion 26b.

As shown in FIG. 2, the lens-barrel 18 is a cylindrical-shaped member whose one end is closed. A through hole 18d for incidence of photographing light is formed in a closed surface 18a. A concave portion (holding portion) 18f having a circular shape as viewed in a plan view is provided to communicate with the through hole 18d of the lens-barrel 18. The inner diameter of the concave portion 18f is smaller than the inner diameter of the inner surface 18e of a tubular portion 18b. The concave portion 18f is a portion for alignment of the optical axis C of the lens 24 and positioning of the lens 24 in the optical axis C direction.

Also, for an end portion 18c of the tubular portion 18b on a later described image pickup element 44 (see FIG. 1) side in the optical axis C direction of the lens-barrel 18 (hereinafter the image pickup element 44 side will be referred to as "lower side" and the opposite side (photographing light incident side) will be referred to as "upper side" for ease of explanation), a leg portion 19 that is abutted against or comes into contact with a cam surface (upper surface) 22a of a cylindrical cam 22 provided for the CCD holder 13 to be described later is formed to protrude in a downward direction. It is sufficient that the shape and size of the leg portion 19 are determined as appropriate such that when the lens-barrel 18 is appropriately fitted into the CCD holder 13, the leg portion 19 is appropriately abutted against or comes in contact with the cam surface 22a of the cylindrical cam 22 to be described later.

On the end portion 18c side of the lens-barrel 18, an insertion portion 18h, whose diameter is larger than that of the inner surface 18e, is formed. The insertion portion 18h makes it easy to insert the lens 24, the lens 26, and the lens 28 constituting the imaging lens 16 and the lens holding member 70 into the lens-barrel 18, thereby facilitating assembling of the lens unit 12, that is, improving ease of assembling the lens unit 12.

Also, the imaging lens 16 is assembled by disposing, in the lens-barrel 18, the lens 24, the lens holding member 70, the lens 26, and the lens 28 in the stated order from the through hole 18d (light incident direction) side.

The flange portion 24b of the lens 24 is fitted into the concave portion 18f of the lens-barrel 18 which is provided to communicate with the through hole 18d of the lens-barrel 18 so that an upper surface 24d of the flange portion 24b is abutted against or comes into contact with a bottom surface 18g of the concave portion 18f of the lens-barrel 18. The optical axis C of the lens 24 is aligned using a side surface 24c of the flange portion 24b (side surface of the concave portion 18f), and positioning of the lens 24 in the optical axis C direction is achieved using the upper surface 24d.

An upper surface 70b of the lens holding member 70 is abutted against or in contact with the lens 24, and the lens portion 24a of the lens 24 is inserted into the opening portion 70a. The outer diameter of the lens holding member 70 is approximately the same as the inner diameter of the inner surface 18e of the lens-barrel 18.

An upper surface 26e of the flange portion 26b of the lens 26 is abutted against or in contact with a lower surface 70c of the lens holding member 70. Positioning of the lens 26 in the optical axis C direction is achieved using the upper surface 26e of the flange portion 26b. Also, the optical axis C of the lens 26 is aligned using the peripheral surface 26c of the lens 26.

The flange portion 28b of the lens 28 is fitted to an inner surface 26f of the flange portion 26b of the lens 26. Alignment of the optical axis C of the lens 28 and positioning of the lens 28 in the optical axis C direction are achieved using the flange portion 26b of the lens 26. In the manner described above, the imaging lens 16 is assembled and is disposed in the lens-barrel 18.

In this embodiment, the imaging lens 16 has the construction in which the lens 24 is positioned in the lens-barrel 18 and the lens holding member 70 is provided between the lens 24 and the lens 26, which makes it unnecessary to, for instance, form the flange portion of the lens 26 in a shape to fit into the lens 24. As a result, it becomes possible to simplify the lens shapes and set the lens 26 in an easy-to-manufacture shape while preventing a displacement (hereinafter referred to as "inter-lens eccentricity") among the optical axes of the lenses. Therefore, it becomes possible to simplify the construction of the lens unit 12.

Also, in this embodiment, the imaging lens 16 has a construction in which the notched portion 26d, whose diameter is smaller than that of the peripheral surface 26c, is provided on the lens holding member 70 side of the flange portion 26b of the lens 26. Thus, the notched portion 26d of the lens 26 has the diameter smaller than that of the inner surface 18e of the lens-barrel 18, so incorporation of the lens 26 into the lens-barrel 18 is facilitated. That is, ease of assembling the lens unit 12 is improved.

In the manner described above, the lenses 26 and 28 have shapes with which the optical axes C of the lenses 26 and 28 coincide with each other when assembled by fitting the flange portions 26b and 28b to each other. In addition, the illustrated example shows more preferable state where a positional relation between the lenses 26 and 28 in the optical axis C direction also becomes proper when assembled. The imaging lens 16 is assembled such that the lens 24 is positioned using the concave portion 18f of the lens-barrel 18, the lenses 26 and 28 are assembled by fitting the flange portions 26b and 28b to each other, and the assembled lenses 26 and 28 are positioned by abutting the upper surface 26e of the lens 26 against the lower surface 70c of the lens holding member 70 disposed below the lens 24. With this structure, the inter-lens eccentricity is automatically eliminated and the optical axes C of the lenses are brought into coincidence with each other, and more preferably, positioning of the lenses in the optical axis C direction is also achieved.

Therefore, in this embodiment, it is possible to set the imaging lens 16 in the lens-barrel 18 while preventing the inter-lens eccentricity and it also becomes possible to perform positioning of the lenses in the optical axis C direction. That is, it is possible to hold the imaging lens 16 in the lens-barrel 18 with high dimensional holding accuracy.

In this embodiment, the concave portion 18f of the lens-barrel 18 is used for positioning the lens 24 and the inner surface 18e of the lens-barrel 18 is used for positioning the lens 26. As described above, in this embodiment, the concave portion 18f and the inner surface 18e of the lens-barrel 18 are set as reference surfaces for positioning, so there is a necessity to enhance molding accuracy of the lens-barrel 18. For instance, the inner diameter of the lens-barrel 18 in this embodiment is around 4 to 6 mm. Also, accuracy of several μm is required for the inter-lens eccentricity.

A mold used to form the lens-barrel 18 in this embodiment has a two-step structure in which the diameter of a tip end portion for molding the concave portion 18f is larger than that of a portion for molding the inner surface 18e. For instance, in the case where the mold is produced through turning-machining, it is possible to produce the mold by fixing a material only once and turning it. Therefore, it is possible to produce the mold with high accuracy.

It should be noted here that when the mold is formed in a shape that needs refixing of the material which was once fixed to be turned in the turning-machining, centering accuracy is lowered and machining accuracy of the mold cannot be enhanced as compared with the case where the material is fixed only once.

As described above, it is possible to produce the mold for forming the lens-barrel 18 in this embodiment with high accuracy, which makes it possible to form the concave portion 18f and the inner surface 18e of the lens-barrel 18 with required high accuracy. Therefore, the positioning accuracy of the lens 24 and the lens 26 can be guaranteed at required high dimensional holding accuracy.

The lens unit 12 according to the present invention has the construction described above, in which the lens 24 is positioned in the optical axis C direction using the concave portion 18f of the lens-barrel 18, the lenses 26 and 28 are assembled by fitting the flange portions 26b and 28b to each other, and the assembled lenses 26 and 28 is positioned by abutting the upper surface 26e of the lens 26 against the lower surface 70c of the lens holding member 70 below the lens 24. With this construction, alignment of the optical axes C of the lenses 24, 26, and 28 with one another is achieved, further, positioning of the lenses in the optical axis C direction is also achieved, and still further, the inter-lens eccentricity is prevented. In addition, even the lens-barrel 18 having a straight pipe shape can incorporate the lens 24 deeply into the lens-barrel 18 with ease because the diameter of the concave portion 18f of the lens-barrel 18 is set larger.

It should be noted here that in the illustrated example, the imaging lens 16 is constructed using the combination lens including the three lenses 24, 26, and 28 and the lens holding member 70, but the present invention is not limited to this. There occurs no problem even when the number of the lenses of the imaging lens 16 is two or less or four or more. Note that when a diaphragm 23 is unnecessary, it may be omitted.

Also, the CCD holder 13 holds the lens unit 12 and the image pickup element 44. The CCD holder 13 includes a cylindrical-shaped lens unit accommodation portion 13a for accommodating the lens-barrel 18 (lens unit 12) and a unit holding portion 13c for accommodating the image pickup element 44. In addition, the CCD holder 13 includes an opening portion 13b that establishes communication between the lens unit accommodation portion 13a and the unit holding portion 13c. The opening portion 13b allows light which bears image information of a subject and is condensed by the-imaging lens 16 to be incident on the image pickup element 44.

The lens unit accommodation portion 13a is a cylindrical hole portion into which the lens-barrel 18 is fitted so as to be rotatable about the optical axis C and movable in the optical axis C direction. In addition, the lens unit accommodation portion 13a has an inner diameter approximately equal to the outer diameter of the lens-barrel 18.

In the lens unit accommodation portion 13a, the cylindrical cam 22 for focus adjustment (for focusing) is formed along the inner surface of the lower end side thereof.

Figure 3A:
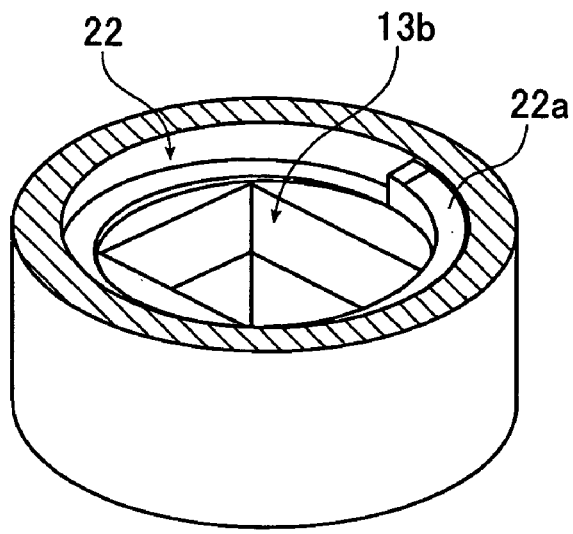
FIG. 3A is a schematic perspective view showing a cylindrical cam for focusing (focus adjustment) of the compact image pickup module shown in FIG. 1, in the first embodiment.

As shown in FIG. 3A, the cylindrical cam 22 for focus adjustment (focusing) is an annular cylindrical cam whose upper surface is set as the cam surface 22a and whose center axis agrees with the optical axis C. In addition, the cylindrical cam 22 gradually increases in height (whose cam surface 22a is elevated) in a circumferential direction. In this embodiment, for example, the cylindrical cam 22 gradually increases in height in a counterclockwise direction.

In this embodiment, only one cylindrical cam 22 making one turn is used but the present invention is not limited to this. For instance, as a cylindrical cam member 60 shown in FIG. 3B, two cylindrical cams 25a and 25b that are each in an annular shape making a half turn may be used instead. Alternatively, three cylindrical cams that each make ⅓ turn or four cylindrical cams that each make ¼ turn may be provided instead.

Also, in this embodiment, one cylindrical cam 22 in an annular shape making one turn is provided but the present invention is not limited to this. One cylindrical cam in an annular shape making less than one turn such as a half turn or ⅔ turn may be provided instead. In addition, when multiple cylindrical cams are provided, the cylindrical cams may have annular shapes that do not make an entire turn, that is, make an intermittent turn.

According to the present invention, the construction is not limited to the one where the cylindrical cam 22 is formed for the unit holding portion 13c and the leg portion 19 being abutted against or in contact with the cam surface 22a of the cylindrical cam 22 is formed for the lens-barrel 18. A cylindrical cam may be formed for the lens-barrel 18, or the lower surface of the lens-barrel 18 may be set as a cylindrical cam and a leg portion abutted against the cam surface of the cylindrical cam may be formed for the unit holding portion 13c, to thereby perform focus adjustment through adjustment of the position of the lens-barrel in the optical axis direction by the action of the cylindrical cam and the leg portion.

The unit holding portion 13c is a portion for accommodating the image pickup element 44 and is a concave portion in an approximately quadrilateral shape as viewed in a plan view. Also, a second concave portion 13d is formed in the CCD holder 13, which communicates with the unit holding portion 13c and reaches a lower surface 136 of the CCD holder 13.

Here, the image pickup element 44 is provided on a substrate 40 with a flexible print substrate (hereinafter abbreviated as "FPC") 42 therebetween. On the image pickup element 44, an infrared cut filter 46 is provided. The image pickup element 44 with the infrared cut filter 46 provided thereon is fitted into the unit holding portion 13c so that the infrared cut filter 46 is fitted thereinto first.

In this embodiment, the FPC 42 is a substrate for outputting an electric signal obtained by the image pickup element 44 to the outside, and a photographed image can be displayed by connecting a device, such as an image signal processing unit and a display device, to the FPC 42.

Also, the FPC 42 and the image pickup element 44 are connected to each other through a wire by wire bonding, for instance. The second concave portion 13d is provided, so it becomes possible to fit the image pickup element 44 into the unit holding portion 13c while preventing contact of the wire to the unit holding portion 13c.

It should be noted here that as the image pickup element 44, it is possible to use an image sensor of CCD type or CMOS type, for instance.

As shown in FIG. 1, when the lens-barrel 18 is fitted into the lens unit accommodation portion 13a, the leg portion 19 provided at a lower end portion of the lens-barrel 18 is abutted against or in contact with the cam surface 22a of the lens unit accommodation portion 13a.

Therefore, after the lens-barrel 18 is fitted into the lens unit accommodation portion 13a, by relatively rotating the lens-barrel 18 and the lens unit accommodation portion 13a under a state in which the leg portion 19 of the lens-barrel 18 and the cam surface 22a are abutted against or in contact with each other, the height of the cam surface 22a against which the leg portion 19 is abutted is changed. Through the changing of the height, the leg portion 19, that is, the lens-barrel 18 is moved vertically by the cylindrical cam 22 in a direction parallel to the optical axis C. Through the vertical movement of the lens-barrel 18, the distance between the imaging lens 16 and the light receiving surface of the image pickup element 44 is changed, to thereby perform focus adjustment (focusing).

Note that it is sufficient that this focus adjustment is performed using a publicly known method with which, for instance, a reference image is taken and the focus adjustment is performed while observing an image reproduced from the reference image.

After the lens unit 12 is fitted into the CCD holder 13 and the focus adjustment is performed in the manner described above, it is possible to complete the image pickup module 10 by, for instance, injecting an adhesive from an adhesive injecting portion appropriately formed in the CCD holder 13 to thereby fix the lens unit 12 and the CCD holder 13 to each other.

The image pickup module 10 in this embodiment has the construction in which the lens-barrel 18 and the CCD holder 13 are each formed in a straight pipe shape having no screw thread and the like and the lens-barrel 18 is fitted into the CCD holder 13, so that the lens-barrel 18 is prevented from being inclined in the CCD holder 13 (unit holding portion 13c). Accordingly, it is possible to prevent inclination of the optical axis C of the imaging lens 16 with respect to the light receiving surface of the image pickup element 44 from occurring.

Also, the lens unit 12 of the image pickup module 10 in this embodiment is simple in construction and is high in assembling ease. Therefore, the image pickup module 10 in this embodiment is also simple in construction and is high in assembling ease.

In the conventional compact image pickup module, as described above, the focus adjustment is performed by the action of the screw threads, so there occurs a situation where the lens-barrel is inclined due to gaps between the screw threads, leading to inclination of the optical axis of the imaging lens, which makes it impossible to take a high-quality image.

In contrast to this, in this embodiment, the lens-barrel 18 and the CCD holder 13 (unit holding portion 13c) are each formed in a straight pipe shape, the lens-barrel 18 is fitted into the CCD holder 13 so as to be rotatable and movable in the optical axis direction, and focusing is performed by the action of the cylindrical cam. As a result, the image pickup module 10 is realized, in which a simple construction is used, focus adjustment is appropriately performed, inclination of the optical axis is prevented, and it is possible to take a high-quality image. In addition, in this embodiment where the lens-barrel is supported by the inner surface of the straight pipe shaped CCD holder 13, it becomes possible to support the lens-barrel by a large region in the vertical direction as compared with the case where the screw threads are used. Therefore, it also becomes possible to hold the lens-barrel with stability, which is advantageous to prevention of inclination of the optical axis.

In the image pickup module 10 in this embodiment, the gap between the outer surface of the lens-barrel 18 and the inside wall of the unit holding portion 13c of the CCD holder 13 (clearance therebetween) is not specifically limited, and it is sufficient that the gap is determined such that the lens-barrel 18 can be fitted into the CCD holder 13 so as to be rotatable and movable in the optical axis direction.

It should be noted here that in order to suitably prevent the inclination of the lens-barrel 18, the gap between the lens-barrel 18 and the CCD holder 13 is preferably set to 1 to 20 µm, more preferably 1 to 10 µm, and particularly preferably 1 to 5 µm.

Also, a smaller gap is more preferable, although the appropriate size of the gap is determined depending on roundness or cylindricity, and the surface roughness of the fit surfaces. When consideration is given to the gap described above, the roundnesses of the outer surface of the lens-barrel and the inner wall surface of the unit holding portion 13c of the CCD holder 13 are each preferably set to 20 µm or less, more preferably 10 µm or less, and particularly preferably 1 µm or less. Also, the cylindricities of the outer surface of the lens-barrel and the inner wall surface of the unit holding portion 13c of the CCD holder 13 are preferably set to 20 µm or less, more preferably 10 µm or less, and particularly preferably 1 µm or less. Further, regarding the surface roughnesses of the fit surfaces of the lens-barrel 18 and the unit holding portion 13c, arithmetic average roughness Ra is preferably set to 10 µm or less, more preferably 2 µm or less, and particularly preferably 0.2 µm or less.

By satisfying at least one of the ranges described above, preferably, by satisfying all of them, it becomes possible to suitably prevent inclination of the optical axis and favorably ensure workability of the focus adjustment and the like while ensuring industrially stable productivity.

Figure 4:
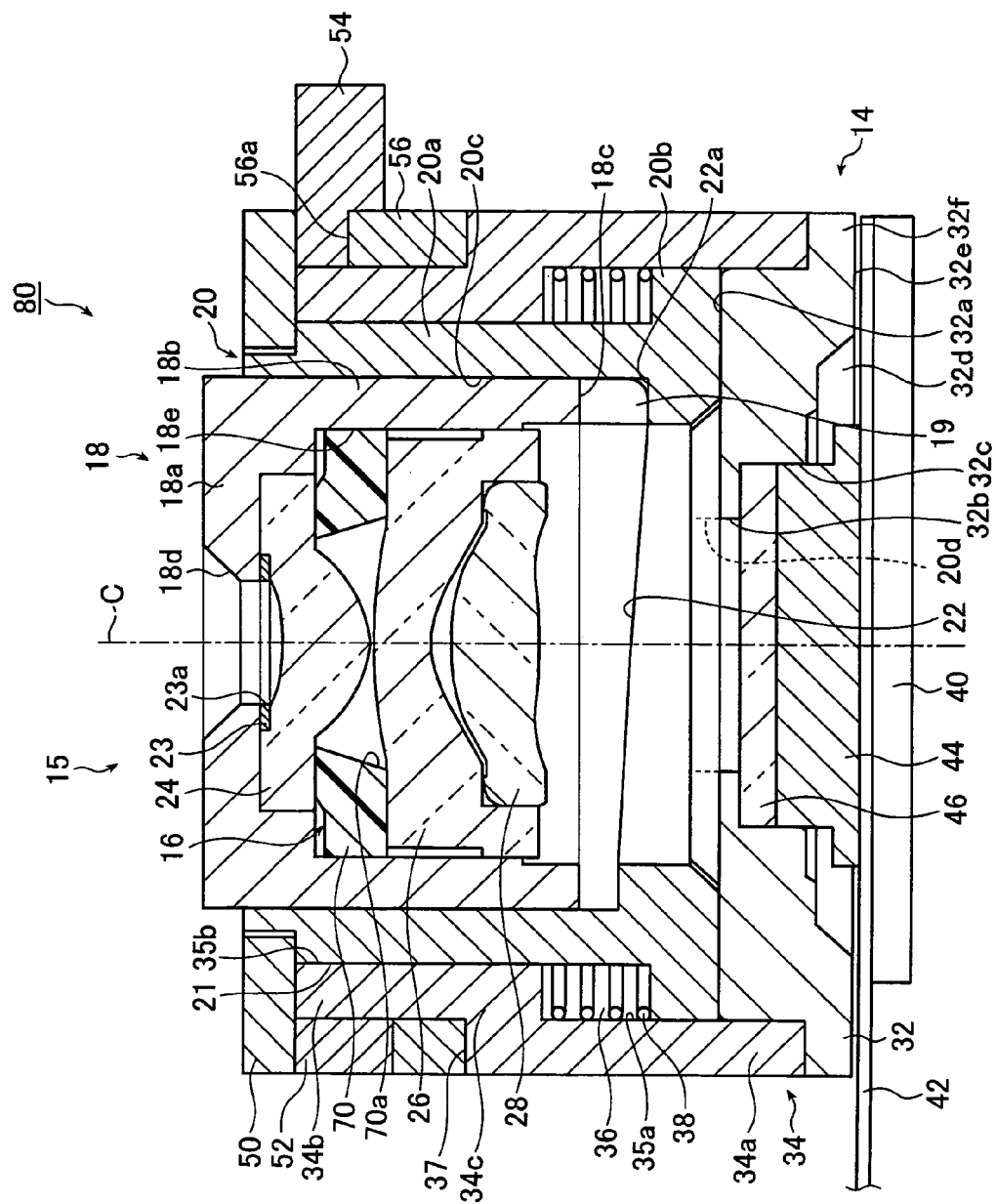
FIG. 4 is a schematic cross-sectional view showing a compact image pickup module according to a second embodiment of the present invention.
Figure 5:
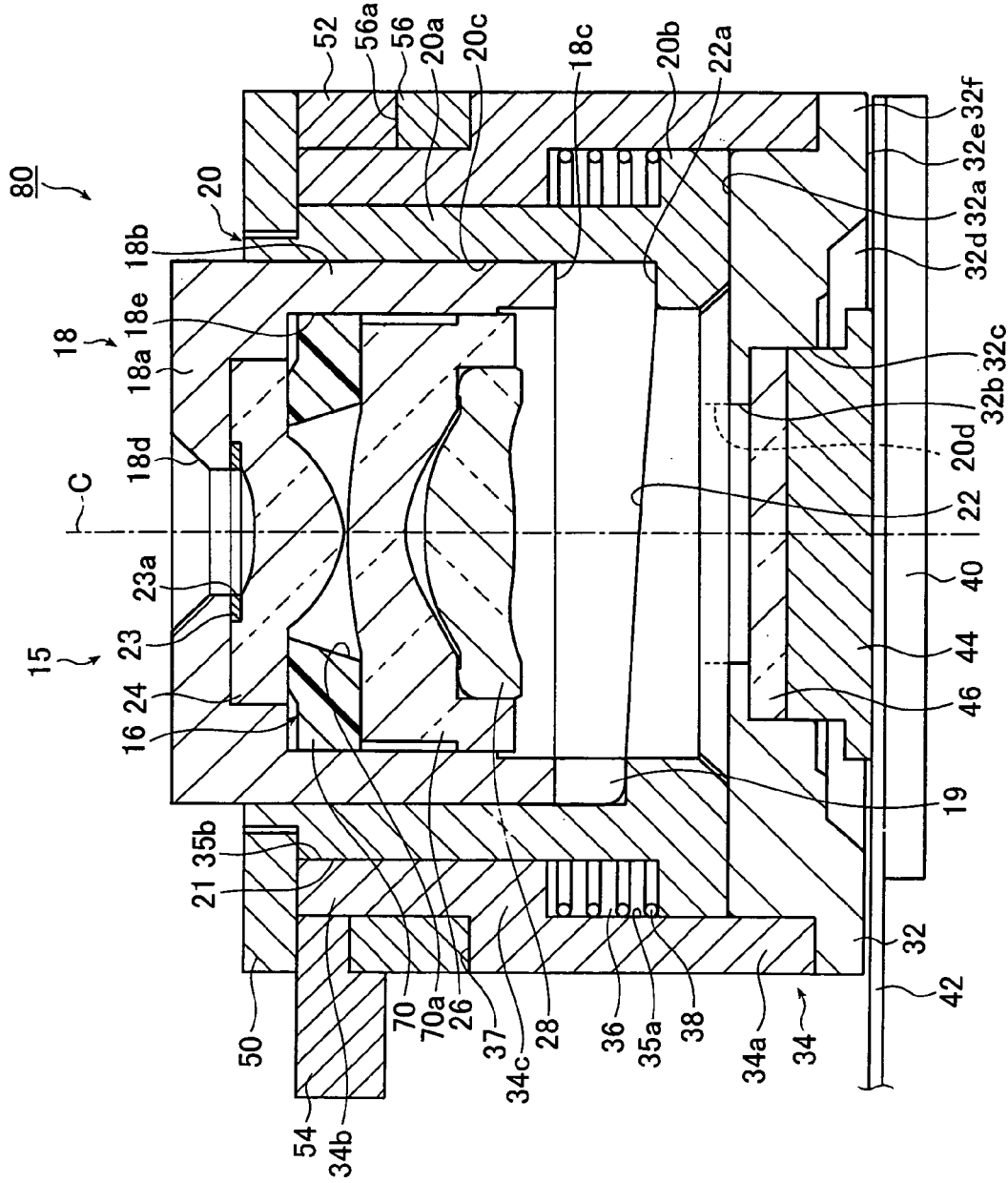
FIG. 5 is a schematic cross-sectional view showing a state of macro photographing of the compact image pickup module according to the second embodiment.

Next, a second embodiment of the present invention will be described. FIG. 4 is a schematic cross-sectional view showing a compact image pickup module according to the second embodiment of the present invention, and FIG. 5 is a schematic cross-sectional view showing a state for macro photographing of the compact image pickup module shown in FIG. 4.

It should be noted here that each construction element that is the same as a construction element of the compact image pickup module in the first embodiment of the present invention shown in FIGS. 1, 2, and 3A is given the same reference numeral and the detailed description thereof will be omitted.

The image pickup module 80 in this embodiment is applied to a mobile telephone or a PDA each having a photographing function, an inexpensive, compact, and fixed focus digital camera, or the like. The image pickup module 80 differs from the image pickup module 10 of the first embodiment (see FIG. 1) in that the image pickup module 80 has a macro photographing function (close-up photographing function) and is capable of switching a photographing state between an ordinary photographing state and a macro photographing state. Other constructions are the same as those of the image pickup module 10 of the first embodiment and the detailed description thereof will be omitted.

The image pickup module 80 in this embodiment basically includes a lens unit 15 and a CCD holder (imaging element holder) 14.

The lens unit 15 includes the imaging lens 16, the lens-barrel 18 for holding the imaging lens 16, and a macro switching member (hereinafter referred to as "switching member") 20 into which the lens-barrel 18 is fitted to be fixed thereto. That is, the lens unit 15 includes the lens-barrel 18 and the switching member 20.

The switching member 20 holds the lens-barrel 18 therein and switches the position of the imaging lens 16 (lens-barrel 18) in the optical axis C direction in accordance with which one of macro photographing and ordinary photographing is to be performed.

The switching member 20 is closed at one end and includes a cylindrical-shaped tubular portion 20*a* into which the lens-barrel 18 is fitted, and a circular-shaped flange portion (convex portion) 20*b* which is provided for an outer peripheral surface (outer wall surface) 21 at a lower end on a closed side of the tubular portion 20*a* and whose center is set at an optical axis C. For an upper end of the tubular portion 20*a*, a flange portion 50 is provided. Also, the cylindrical cam 22 for focus adjustment (focusing) is formed along an inner surface 20*c* on a lower end side of the tubular portion 20*a*. Further, an opening portion 20*d* is formed in approximately the center of the switching member 20 on a lower end side. The opening portion 20*d* allows light which bears image information of a subject and is condensed by the imaging lens 16 to be incident on the image pickup element 44.

The cylindrical cam 22 for focusing (focus adjustment) in this embodiment has the same construction as the cylindrical cam 22 of the first embodiment (see FIG. 3A).

Figure 3B:
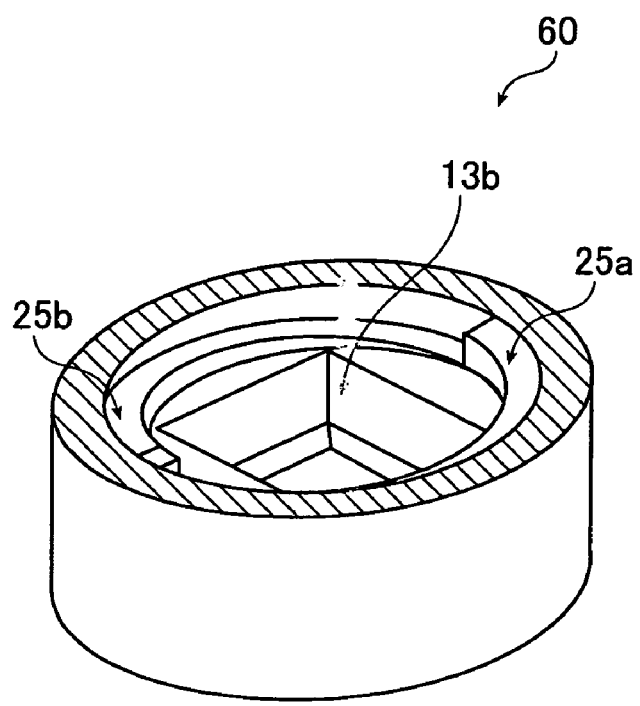
FIG. 3B is a schematic perspective view showing a modification of the cylindrical cam for focusing (focus adjustment) of the compact image pickup module in the first embodiment.

Here, the cylindrical cam 22 in this embodiment is also capable of using the construction of the cylindrical cam member 60 shown in FIG. 3B like in the first embodiment.

The present invention is not limited to the construction in which the cylindrical cam 22 is formed for the switching member 20 and the leg portion 19 abutted against the cam surface 22*a* of the cylindrical cam 22 is formed for the lens-barrel 18. For instance, a cylindrical cam may be formed for the lens-barrel 18, or the lower surface of the lens-barrel 18 may serve as a cylindrical cam and a leg portion abutted against the cam surface of the cylindrical cam may be formed for the switching member 20. Even with this construction, it is possible to perform the focus adjustment through adjustment of the position of the lens-barrel in the optical axis direction by the action of the cylindrical cam and the leg portion.

In this embodiment, when the lens-barrel 18 is fitted into the switching member 20, the leg portion 19 provided at the lower end portion of the lens-barrel 18 is abutted against or in contact with the cam surface 22*a* of the switching member 20.

Therefore, after the lens-barrel 18 is fitted into the switching member 20, by relatively rotating the lens-barrel 18 and the switching member 20 under a state in which the leg portion 19 of the lens-barrel 18 and the cam surface 22*a* are abutted against each other, the height of the cam surface 22*a* against which the leg portion 19 is abutted is changed. Through the changing of the height, the leg portion 19, that is, the lens-barrel 18 is moved vertically by the cylindrical cam 22 in a direction parallel to the optical axis C. Through the vertical movement of the lens-barrel 18, the distance between the imaging lens 16 and the light receiving surface of the image pickup element 44 is changed and focus adjustment (focusing) is performed.

As shown in FIG. 4, a ring member 52 for macro photographing (for photographing distance switching) is further provided for an outer peripheral portion of a lower surface of the flange portion 50. The ring member 52 is connected to the tubular portion 20*a* of the switching member 20.

The ring member 52 is an annular-shaped member and a driven portion (not shown) that is abutted against or in contact with a cam surface 56*a* to be described later is formed for a part of a lower surface of the ring member 52. Also, a lever 54 is provided for an outer peripheral surface of the ring member 52. With the lever 54, as will be described later, the ring member 52 is rotated about the optical axis C together with the main body of the switching member 20.

Also, the CCD holder 14 includes a sensor holding portion 32 that holds the lens unit 15 and the image pickup element 44 and a cylindrical-shaped lens unit accommodation portion 34 that accommodates the lens unit 15 (the lens-barrel 18 and the switching member 20).

The sensor holding portion 32 is formed in a disk shape, on which the lens unit 15 is placed. On an upper surface 32*a* of the sensor holding portion 32, the switching member 20 of the lens unit 15 is placed. In the upper surface 32*a*, an opening portion 32*b* is formed at a position corresponding to the opening portion 20*d* of the switching member 20.

Also, a first concave portion 32*c* is formed on the sensor holding portion 32 to communicate with the opening portion 32*b*. Further, a second concave portion 32*d* is formed on the sensor holding portion 32, which communicates with the first concave portion 32*c* and reaches a lower surface 32*e* of the sensor holding portion 32.

Still further, a flange portion 32*f* is formed on the periphery of the sensor holding portion 32. The lens unit accommodation portion 34 is fitted to the flange portion 32*f*.

The first concave portion 32*c* of the sensor holding portion 32 accommodates the image pickup element 44, and has an approximately quadrilateral shape as viewed in a plan view.

Here, in this embodiment, like in the first embodiment, the image pickup element 44 is provided on the substrate 40 with the FPC 42 therebetween. On the image pickup element 44, the infrared cut filter 46 is provided. The image pickup element 44 with the infrared cut filter 46 provided thereon is fitted into the first concave portion 32*c* so that the infrared cut filter 46 is fitted thereinto first.

The flange portion 32*f* of the sensor holding portion 32 is fitted to the lens unit accommodation portion 34, and the lens unit accommodation portion 34 accommodates the lens unit 15 together with the sensor holding portion 32. The lens unit accommodation portion 34 covers the periphery of the lens unit 15 and is constructed using a stepped cylindrical member. The lens unit accommodation portion 34 includes the base portion 34*a* having a larger diameter and the end portion 34*b* having a smaller diameter that is connected to the base portion 34*a* through the shoulder portion 37.

The inner diameter of the base portion 34*a* is approximately equal to the outer diameter of the flange portion 20*b* of the switching member 20. Also, the base portion 34*a* is fitted to the flange portion 32*f* of the sensor holding portion 32. Further, the inner diameter of the end portion 34*b* is approximately equal to the outer diameter of the peripheral surface 21 of the switching member 20. The switching member 20 is provided so as to freely rotate about the optical axis C in the lens unit accommodation portion 34.

When the switching member 20 is rotated, an inner surface 35b of the end portion 34b and the peripheral surface 21 of the switching member 20 each serve as a sliding surface.

Also, an abutting member 56 that regulates the movement of the lever 54 between an ordinary photographing position at which an ordinary photographing state is obtained, and a macro photographing position at which a macro photographing state is obtained, is provided on the shoulder portion 37. Further, the cam surface 56a against which the driven portion of the ring member 52 is abutted, is formed between the abutting member 56 and the flange portion 50. The cam surface 56a has a semicircular shape, whose center is set at the optical axis C, and gradually increases in height in a circumferential direction. The driven portion moves on the cam surface 56a, and a side surface of the driven portion is abutted against the abutting member 56 at the ordinary photographing position and the macro photographing position. With this construction, movement of the ring member 52 is regulated.

In this embodiment, when the lever 54 is rotated, the switching member 20 rotates on the upper surface 32a of the sensor holding portion 32 together with the ring member 52 about the optical axis C in the lens unit accommodation portion 34.

In the lens unit accommodation portion 34 in this embodiment, between the peripheral surface 21 of the switching member 20 and an inner surface 35a of the base portion 34a, an accommodation portion 36 surrounded by the flange portion 20b, a step portion (convex portion) 34c formed for the inner wall surface (inner surfaces 35a, 35b) of the lens unit accommodation portion 34, the base portion 34a, and the cylindrical portion 20a is formed around the whole peripheral surface 21 of the switching member 20. In the accommodation, portion 36, one cylindrical coil spring 38 is provided.

The cylindrical coil spring 38 is arranged so as to be abutted against or in contact with the upper surface of the flange portion 20b at the lower end of the switching member 20 and the inner surface of the step portion 34c in the lens unit accommodation portion 34. The cylindrical coil spring 38 biases the switching member 20 and the lens unit accommodation portion 34 in a direction in which a distance therebetween is increased. As a result, in the lens unit accommodation portion 34, the lens unit 15 is placed under a state where it is biased by the cylindrical coil spring 38 in a direction toward the upper surface 32a of the sensor holding portion 32.

In FIG. 4, the image pickup module 80 is placed under a state in which the lever 54 is positioned at the ordinary photographing position. Under this state, the leg portion 19 of the lens-barrel 18 is abutted against the cam surface 22a of the cylindrical cam 22 at the lowest position and thus a distance between the image pickup element 44 and the imaging lens 16 is the minimum.

When the lever 54 is moved from the ordinary photographing position to the macro photographing position, the switching member 20 is rotated, the height of the cam surface of the cylindrical cam 22, against which the leg portion 19 is abutted, gradually increases, and the lens-barrel 18 is elevated by the cylindrical cam 22. As a result, the image pickup module 80 is placed under the macro photographing state shown in FIG. 5 in which the leg portion 19 reaches the highest point of the cylindrical cam 22 and thus the distance between the image pickup element 44 and the imaging lens 16 is the maximum.

Conversely, when the lever 54 is moved from the macro photographing position to the ordinary photographing position, the switching member 20 is rotated in a reverse direction, the height of the cam surface of the cylindrical cam 22, against which the leg portion 19 is, abutted, gradually decreases, and the lens-barrel 18 is moved downward. As a result, the image pickup module 80 is placed under the ordinary photographing state shown in FIG. 4 in which the leg portion 19 reaches the lowest point of the cylindrical cam 22.

In the image pickup module 80 in this embodiment, when the lever 54 is moved to the ordinary photographing position or the macro photographing position, the lens-barrel 18 is moved in the direction parallel to the optical axis C. Thus, the distance between the imaging lens 16 and the image pickup element 44 in the optical axis C direction is changed, so that switching between the ordinary photographing state and the macro photographing state is performed. As described above, it is possible to perform focus adjustment (focusing) using the cylindrical cam 22 and the leg portion 19.

Also, the image pickup module 80 in this embodiment has the construction in which the lens-barrel 18 and the switching member 20 are each formed in a straight pipe shape having no screw thread and the like and the lens-barrel 18 is fitted into the switching member 20, so that the lens-barrel 18 is not inclined in the switching member 20. Accordingly, it becomes possible to prevent inclination of the optical axis C of the imaging lens 16 with respect to the light receiving surface of the image pickup element 44 from occurring.

Further, in the present invention in which the lens-barrel 18 is supported by the straight-pipe-shaped inner surface 20c of the switching member 20, it becomes possible to support the lens-barrel by a large region in the optical axis C direction as compared with a case where screw threads are used. Also in this regard, the construction according to the present invention is advantageous to prevention of inclination of the optical axis C because the lens-barrel 18 can be held with stability.

It should be noted here that as described above, in the conventional compact image pickup module, the focus adjustment is performed using screw threads, so the lens-barrel is inclined due to gaps between the screw threads, leading to inclination of the optical axis of the imaging lens, which makes it impossible to take a high-quality image.

The constructions of the lens-barrel 18 and the imaging lens 16 in the lens unit 15 of the image pickup module 80 in this embodiment are the same as those in the first embodiment. Therefore, the lens unit 15 in this embodiment is of course capable of providing the same effects as in the case of the lens unit 12 in the first embodiment. In addition, like the image pickup module 10 in the first embodiment, the image pickup module 80 in this embodiment is simple in construction and is high in assembling ease.

It should be noted here that in the image pickup module 80 according to the present invention, the gap between the switching member 20 and the lens unit accommodation portion 34 (clearance therebetween) is not specifically limited and it is sufficient that the gap is determined such that it is possible to fit the switching member 20 into the lens unit accommodation portion 34 under a rotatable state.

In order to suitably prevent inclination of the switching member 20 from occurring, the gap between the switching member 20 and the lens unit accommodation portion 34 is preferably set to 2 to 20 µm, more preferably 2 to 10 µm, and particularly preferably 2 to 5 µm.

Also, a smaller gap is more preferable but the appropriate size of the gap is determined depending on roundness or cylindricity, and surface roughness of fit surfaces. When consideration is given to the gap described above, the roundnesses of the peripheral surface 21 of the switching member 20 and the inner surfaces 35a and 35b of the lens unit accommodation portion 34 are each preferably set to 20 µm or less, more preferably 10 µm or less, and particularly preferably 1 µm or less. Also, the cylindricities of the peripheral surface 21 and the inner surfaces 35a and 35b are each preferably set to 20 µm or less, more preferably 10 µm or less, and particularly preferably 1 µm or less. Further, regarding the surface roughnesses of the fit surfaces of the switching member 20 and the lens unit accommodation portion 34, arithmetic average roughness Ra is preferably set to 10 µm or less, more preferably 2 µm or less, and particularly preferably 0.2 µm or less.

By satisfying at least one of the ranges described above, preferably, by satisfying all of them, it becomes possible to suitably prevent inclination of the optical axis and favorably ensure workability of the focus adjustment and the like while ensuring industrially stable productivity.

It should be noted here that in the present invention, the cam surface 56a is formed between the abutting member 56 and the flange portion 50, and the driven portion that is abutted against the cam surface 56a is formed for the ring member 52, but the present invention is not limited to this. For instance, the cam surface may be formed for the ring member 52 and the driven portion may be formed between the abutting member 56 and the flange portion 50.

The macro photographing function in the conventional compact image pickup module is realized using multiple springs, so the number of components is large. Also, multiple springs are used, so there is a possibility that the lens unit will be inclined due to differences in bias force among the springs or the like. As a result, there is a high possibility that inconveniences will occur in which, for instance, the optical axis of the imaging lens is inclined or the lens unit is caught in the lens unit accommodation portion and therefore the movement of the lens unit becomes unstable or impossible. Conversely, in order to ensure stability of the movement of the lens unit, it is required to obtain a large clearance between the lens unit and the lens unit accommodation portion. In this case, however, a possibility of image quality reduction ascribable to inclination of the optical axis or the like is increased.

In contrast to this, in the image pickup module 10 according to the present invention, the macro photographing function is realized with the cylindrical cam 22 and one cylindrical coil spring 38 provided to surround the periphery of the lens unit 15. As a result, it becomes possible to reduce the number of components, and eliminate various inconveniences that occur in the case of using multiple springs due to individual differences of the multiple springs. Therefore, it is possible to perform ordinary photographing and macro photographing for taking high-quality images with less image quality degradation ascribable to inclination of the optical axis or the like with stable operation.

Although the lens unit and compact image pickup module according to the present invention have been described in detail above, the present invention is not limited to the embodiments described above and it is of course possible to make various modifications and changes without departing from the gist of the present invention.

What is claimed is:

1. A lens unit, comprising: a
an imaging lens including plural lenses and a ring-shaped lens holding member that is provided at at least one place between said plural lenses and holds at least one of said plural lenses; and
a cylindrical-shaped lens-barrel including a lens holding portion that holds said imaging lens,
wherein each of said plural lenses includes a lens portion having an optical function and a flange portion on a periphery of said lens portion, said flange portion of each of said plural lenses being fittable to said flange portion of at least one of the other lenses of said plural lenses, or said lens holding portion or an inner surface of said lens-barrel, and lenses which are combined with each other through fitting of said flange portions of said lenses have respective shapes in which optical axes of said lenses coincide with each other under a fitting state of said flange portions of said lenses, and
wherein said flange portion of one lens of said plural lenses is fitted to said lens holding portion of said lens-barrel and held by said lens holding member in said lens-barrel, and
at least two lenses of said plural lenses are positioned by abutting said flange portion of one of said at least two lenses against said lens holding member and an inner surface of said lens-barrel and by fitting said flange portion of another one of said at least two lenses to said flange portion of said one of said at least two lenses, and are arranged in said lens-barrel so that said optical axes of said at least two lenses coincide with said optical axis of said one lens held by said lens holding portion of said lens-barrel.

2. The lens unit according to claim 1, wherein each of said plural lenses has a shape in which a position of each lens in an optical axis direction becomes appropriate under at least one of a state in which said flange portion of a lens is fitted to said lens holding portion, a state in which a lens is combined with said at least one of the other lenses through fitting of said flange portion of said lens to said flange portion of said at least one of the other lenses, and a state in which said flange portion of a lens is abutted against said lens holding member.

3. The lens unit according to claim 1, wherein a notched portion, whose diameter is smaller than an inner diameter of said inner surface of said lens-barrel, is formed on a lens holding member side of said flange portion of said one of said at least two lenses that is abutted against said inner surface of said lens-barrel.

4. The lens unit according to claim 3,
wherein one end portion of said lens-barrel is closed, a through hole is formed in the closed one end portion of said lens-barrel, and said lens holding portion is formed to communicate with said through hole,
wherein said imaging lens includes three lenses and one lens holding member, and
wherein a first lens is fitted to said holding portion of said lens-barrel and is held and positioned by said lens holding member, and a second lens and a third lens combined with each other are positioned through abutting said flange portion of said second lens, to which said flange portion of said third lens is fitted, against said lens holding member and said inner surface of said lens-barrel.

5. The lens unit according to claim 1,
wherein said plural lenses includes a first lens and at least two lenses having a second lens and a third lens, said flange portion of said first lens is fitted to said lens holding portion of said lens-barrel and said first lens is held by said lens holding member in said lens-barrel, and said at least two lenses including said second lens and third lens are positioned by abutting said flange portion of said second lens against said lens holding member and an inner surface of said lens-barrel and by fitting said flange portion of said third lens to said flange portion of said second lens, and are arranged in said lens-barrel so that said optical axes of said at least two lenses coincide with said optical axis of said first lens held by said lens holding portion of said lens-barrel.

6. A compact image pickup module, comprising:

an imaging lens including plural lenses and a ring-shaped lens holding member that is provided at at least one place between said plural lenses and holds at least one of said plural lenses;

a cylindrical-shaped lens-barrel having a lens holding portion that holds said imaging lens;

an image pickup element;

an image pickup element holder which holds said image pickup element and into which said lens-barrel is fitted so as to be rotatable about an optical axis of said imaging lens and movable in a direction of said optical axis of said imaging lens;

a cylindrical cam which has as an upper surface or a lower surface thereof, an annular cam surface whose center is set at said optical axis of said imaging lens and which is formed in one of said lens-barrel and said image pickup element holder; and an abutting member that is abutted against said annular cam surface of said cylindrical cam under &Estate where said lens-barrel is fitted into said image pickup element holder and which is formed in the other of said lens-barrel and said image pickup element holder, wherein each of said plural lenses includes a lens portion having an optical function and a flange portion on a periphery of said lens portion, said flange portion of each of said plural lenses being fittable to said flange portion of at least one of the other lenses of said plural lenses, or said lens holding portion or an inner surface of said lens-barrel, and lenses which are combined with each other through fitting of said flange portions of said lenses have respective shapes in which optical axes of said lenses coincide with each other under a fitting state of said flange portions of said lenses, and wherein said flange portion of one lens of said plural lenses is fitted to said lens holding portion of said lens-barrel and held by said lens holding member in said lens-barrel, at least two lenses of said plural lenses are positioned by abutting said flange portion of one of said at least two lenses against said lens holding member and an inner surface of said lens-barrel and by fitting said flange portion of another one of said at least two lenses to said flange portion of said one of said at least two lenses, and are arranged in said lens-barrel so that said optical axes of said at least two lenses coincide with said optical axis of said one lens held by said lens holding portion of said lens-barrel, and wherein, after focusing is performed through relative rotation of said lens-barrel and said image pickup element holder, said lens-barrel and said image pickup element holder are fixed to each other.

7. The compact image pickup module according to claim 6, wherein each of said plural lenses has a shape in which a position of each lens in an optical axis direction becomes appropriate under at least one of a state in which said flange portion of a lens is fitted to said lens holding portion, a state in which a lens is combined with said at least one of the other lenses through fitting of said flange portion of said lens to said flange portion of said at least one of the other lenses, and a state in which said flange portion of a lens is abutted against said lens holding member.

8. The compact image pickup module according to claim 6, wherein a notched portion, whose diameter is smaller than an inner diameter of said inner surface of said lens-barrel, is formed on a lens holding member side of said flange portion of said one of said at least two lenses that is abutted against said inner surface of said lens-barrel.

9. The compact image pickup module according to claim 8, wherein one end portion of said lens-barrel is closed, a through hole is formed in the closed one end portion of said lens-barrel, and said lens holding portion is formed to communicate with said through hole, wherein said imaging lens includes three lenses and one lens holding member, and wherein a first lens is fitted to said holding portion of said lens-barrel and is held and positioned by said lens holding member, and a second lens and a third lens combined with each other are positioned through abutting said flange portion of said second lens, to which said flange portion of said third lens is fitted, against said lens holding member and said inner surface of said lens-barrel.

10. The compact image pickup module according to claim 6, wherein said plural lenses includes a first lens and at least two lenses having a second lens and a third lens, said flange portion of said first lens is fitted to said lens holding portion of said lens-barrel and said first lens is held by said lens holding member in said lens-barrel, and said at least two lenses including said second lens and third lens are positioned by abutting said flange portion of said second lens against said lens holding member and an inner surface of said lens-barrel and by fitting said flange portion of said third lens to said flange portion of said second lens, and are arranged in said lens-barrel so that said optical axes of said at least two lenses coincide with said optical axis of said first lens held by said lens holding portion of said lens-barrel.

11. A compact image pickup module, comprising:

an imaging lens including plural lenses and a ring-shaped lens holding member that is provided at at least one place between said plural lenses and holds at least one of said plural lenses;

a cylindrical lens holder whose outer wall surface has a first convex portion formed thereon and which includes a cylindrical-shaped lens-barrel having a lens holding portion that holds said imaging lens;

an image pickup element;

an image pickup element holder which holds said image pickup element, into which said lens holder is inserted so as to be rotatable about an optical axis of said imaging lens and movable in an optical axis direction of said imaging lens, and whose inner wall surface has a second convex portion formed thereon;

a coil spring that engages with said first convex portion of said lens holder and said second convex portion of said image pickup element holder and urges said lens holder and said image pickup element holder in a direction in which a distance therebetween is increased;

a first cylindrical cam that has as an upper surface or a lower surface thereof, an annular cam surface whose center is set at said optical axis of said imaging lens and which gradually increases in height in a circumferential direction, and that is formed in one of said lens holder and said image pickup element holder; and an abutting member that is abutted against said annular cam surface of said first cylindrical cam under a state where said lens holder is inserted into said image pickup element holder and that is formed in the other of said lens holder and said image pickup element holder, wherein each of said plural lenses includes a lens portion having an optical function and a flange portion on a periphery of said lens portion, said flange portion of each of said plural lenses being fittable to said flange portion of at least one of the other lenses of said plural lenses, or said lens holding portion or an inner surface of said lens-barrel, and lenses which are combined with each other through fitting of said flange portions of said lenses have respective shapes in which optical axes of said lenses coincide with each other under a fitting state of said flange portions of said lenses, and wherein said flange portion of one lens of said plural lenses is fitted to said lens holding portion of said lens-barrel and held by said lens holding member in said lens-barrel, and at least two lenses of said plural lenses are positioned by abutting said flange portion of one of said at least two lenses against said lens holding member and an inner surface of said lens-barrel and by fitting said flange portion of another one of said at least two lenses to said flange portion of said one of said at least two lenses, and are arranged in said lens-barrel so that said optical axes of said at least two lenses coincide with said optical axis of said one lens held by said lens holding portion of said lens-barrel.

12. The compact image pickup module according to claim 11, wherein said lens holder includes:
said lens-barrel that holds said imaging lens in a fixed manner; and
a photographing distance switching member into which said lens-barrel is fitted so as to be rotatable about said optical axis of said imaging lens and movable in said optical axis direction of said imaging lens, said compact image pickup module further comprising;

a second cylindrical cam that has as an upper surface or a lower surface thereof, an annular cam surface whose center is set at said optical axis of said imaging lens and that is formed in one of said lens-barrel and said photographing distance switching member; and an abutting member that is abutted against said annular cam surface of said second cylindrical cam under a state where said lens-barrel is fitted into said image pickup element holder and that is formed for the other of said lens-barrel and said photographing distance switching member, wherein, after focusing is performed by adjusting a distance between said imaging lens and said image pickup element in said optical axis direction through relative rotation of said lens-barrel and said photographing distance switching member, said lens-barrel and said photographing distance switching member are fixed to each other.

13. The compact image pickup module according to claim 11, wherein each of said plural lenses has a shape in which a position of each lens in an optical axis direction becomes appropriate under at least one of a state in which said flange portion of a lens is fitted to said lens holding portion, a state in which a lens is combined with said at least one of the other lenses through fitting of said flange portion of said lens to said flange portion of said at least one of the other lenses, and a state in which said flange portion of a lens is abutted against said lens holding member.

14. The compact image pickup module according to claim 11, wherein a notched portion, whose diameter is smaller than an inner diameter of said inner surface of said lens-barrel, is formed on a lens holding member side of said flange portion of said one of said at least two lenses that is abutted against said inner surface of said lens-barrel.

15. The compact image pickup module according to claim 14, wherein one end portion of said lens-barrel is closed, a through hole is formed in the closed one end portion of said lens-barrel, and said lens holding portion is formed to communicate with said through hole, wherein said imaging lens includes three lenses and one lens holding member, and wherein a first lens is fitted to said holding portion of said lens-barrel and is held and positioned by said lens holding member, and a second lens and a third lens combined with each other are positioned through abutting said flange portion of said second lens, to which said flange portion of said third lens is fitted, against said lens holding member and said inner surface of said lens-barrel.

16. The compact image pickup module according to claim 11, wherein said plural lenses includes a first lens and at least two lenses having a second lens and a third lens, said flange portion of said first lens is fitted to said lens holding portion of said lens-barrel and said first lens is held by said lens holding member in said lens-barrel, and said at least two lenses including said second lens and third lens are positioned by abutting said flange portion of said second lens against said lens holding member and an inner surface of said lens-barrel and by fitting said flange portion of said third lens to said flange portion of said second lens, and are arranged in said lens-barrel so that said optical axes of said at least two lenses coincide with said optical axis of said first lens held by said lens holding portion of said lens-barrel.

* * * * *